United States Patent
Ji et al.

(10) Patent No.: US 8,995,832 B2
(45) Date of Patent: Mar. 31, 2015

(54) TRANSPONDER AGGREGATOR-BASED OPTICAL LOOPBACK IN A MD-ROADM

(71) Applicants: NEC Laboratories America, Inc., Princeton, NJ (US); NEC Corporation, Tokyo (JP)

(72) Inventors: Philip N. Ji, Princeton, NJ (US); Yoshiaki Aono, Tokyo (JP); Ting Wang, West Windsor, NJ (US)

(73) Assignees: NEC Laboratories America, Inc., Princeton, NJ (US); NEC Corporation, Tokyo (JP)

(*) Notice: Subject to any disclaimer, the term of this patent is extended or adjusted under 35 U.S.C. 154(b) by 221 days.

(21) Appl. No.: 13/855,104

(22) Filed: Apr. 2, 2013

(65) Prior Publication Data

US 2013/0259474 A1 Oct. 3, 2013

Related U.S. Application Data

(60) Provisional application No. 61/618,902, filed on Apr. 2, 2012.

(51) Int. Cl.
*H04J 14/02* (2006.01)
*H04B 10/08* (2006.01)
*H04B 10/00* (2013.01)

(52) U.S. Cl.
CPC ......... *H04J 14/0212* (2013.01); *H04J 14/0204* (2013.01); *H04J 14/0205* (2013.01); *H04J 14/0206* (2013.01); *H04J 14/0217* (2013.01)
USPC ............ 398/48; 398/45; 398/43; 398/69; 398/94

(58) Field of Classification Search
CPC .............. H04J 14/0212; H04J 14/0204; H04J 14/0205; H04J 14/0213
USPC .................................. 398/48, 45, 43
See application file for complete search history.

(56) References Cited

U.S. PATENT DOCUMENTS

| 6,246,497 | B1 | 6/2001 | Bateman et al. | |
|---|---|---|---|---|
| 7,336,901 | B1* | 2/2008 | Soulliere | 398/94 |
| 2001/0024540 | A1* | 9/2001 | Ibukuro et al. | 385/17 |
| 2002/0064336 | A1* | 5/2002 | Graves et al. | 385/17 |

(Continued)

OTHER PUBLICATIONS

Ji ["Colorless and Directionless Multi-Degree Reconfigurable Optical Add/Drop Multiplexers" WOCC 2010].*

(Continued)

*Primary Examiner* — Oommen Jacob
(74) *Attorney, Agent, or Firm* — Joseph Kolodka; Akitaka Kimura

(57) ABSTRACT

The present principles are directed to a transponder aggregator-based optical loopback in a multi-degree colorless, directionless, contention-less, reconfigurable optical add/drop multiplexer. The multiplexer includes a reconfigurable optical add/drop multiplexer section for performing connect operations for wavelength division multiplexing signals among all degrees. The section has a plurality of subsections. Each of the subsections corresponds to a respective one of the degrees and has an optical separator at an input side and an optical combiner at an output side. The multiplexer further includes a transponder aggregator section having a split-and-select switch-based transponder aggregator. The multiplexer also includes an optical line loopback having a connection path between the optical separator at the input side and the optical combiner at the output side of at least one of the subsections.

11 Claims, 16 Drawing Sheets

(56) References Cited

U.S. PATENT DOCUMENTS

2002/0145779 A1* 10/2002 Strasser et al. .............. 359/124
2008/0292310 A1* 11/2008 Li .................................. 398/5
2011/0116790 A1* 5/2011 Sakauchi et al. ............... 398/5
2011/0200324 A1 8/2011 Boertjes et al.
2011/0286746 A1 11/2011 Ji et al.
2013/0259474 A1* 10/2013 Ji et al. .......................... 398/48

OTHER PUBLICATIONS

Ji et al., "Colorless and Directionless Multi-Degree Reconfigurable Optical Add/Drop Multiplexers" Wireless and Optical Communications Conference (WOCC 2010), May 2010, pp. 13-17.

* cited by examiner

US 8,995,832 B2

TRANSPONDER AGGREGATOR-BASED OPTICAL LOOPBACK IN A MD-ROADM

RELATED APPLICATION INFORMATION

This application claims priority to provisional application Ser. No. 61/618,902 filed on Apr. 2, 2012, incorporated herein by reference.

BACKGROUND

1. Technical Field

The present invention relates to signal processing, and more particularly to transponder aggregator-based optical loopback in a multi-degree reconfigurable optical add/drop multiplexer (MD-ROADM).

2. Description of the Related Art

A reconfigurable optical add/drop multiplexer (ROADM) is an important network element in wavelength division multiplexing (WDM) optical networks and has been widely deployed in long haul and metro WDM networks in recent years. A ROADM enables the flexible adding and dropping of any or all WDM channels at the wavelength level without manual configuration or the costly and power-consuming optical-electrical-optical (O-E-O) switches. In mesh or meshed ring optical networks, multi-degree ROADMs (MD-ROADMs) also provide cross-connection functions of WDM signals among different paths, so they are also called wavelength cross-connects (WXCs). Here a degree refers to an input/output pair from a certain direction.

Conventional MD-ROADMs have the issues of colored operation (each add/drop port is restricted to a fixed predetermined wavelength), directional operation (the add/drop operations at each degree are separate, i.e. the node cannot share the transponders among different degrees), and contention operation (blocking occurs if the same wavelength from multiple degrees need to be dropped simultaneously).

SUMMARY

The present principles are directed to transponder aggregator-based optical loopback in a multi-degree reconfigurable optical add/drop multiplexer (MD-ROADM).

According to an aspect of the present principles, there is provided a multi-degree colorless, directionless, contention-less, reconfigurable optical add/drop multiplexer. The multiplexer includes a reconfigurable optical add/drop multiplexer section for performing connect operations for wavelength division multiplexing signals among all degrees. The section has a plurality of subsections. Each of the subsections corresponds to a respective one of the degrees and has an optical separator at an input side and an optical combiner at an output side. The multiplexer further includes a transponder aggregator section having a split-and-select switch-based transponder aggregator. The multiplexer also includes an optical line loopback having a connection path between the optical separator at the input side and the optical combiner at the output side of at least one of the subsections. According to another aspect of the present principles, there is provided a method. The method includes providing a multi-degree colorless, directionless, contention-less, reconfigurable optical add/drop multiplexer having a reconfigurable optical add/drop multiplexer section and a transponder aggregator section. The multiplexer section has a plurality of subsections. Each of the subsections corresponds to a respective one of the degrees and has an optical separator at an input side connected to an input of the transponder aggregator section and an optical combiner at an output side connected to an output of the transponder aggregator section. The method further includes adding an optical line loopback having a connection path between the optical separator at the input side and the optical combiner at the output side of at least one of the subsections.

According to yet another aspect of the present principles, there is provided a multi-degree colorless, directionless, contention-less, reconfigurable optical add/drop multiplexer. The multiplexer includes a reconfigurable optical add/drop multiplexer section for performing connect operations for wavelength division multiplexing signals among all degrees. The multiplexer further includes a transponder aggregator section having a split-and-select switch-based transponder aggregator. The aggregator has a (N+1)×(L+1) split-and-select switch for a drop side of the aggregator and another (N+1)×(L+1) split-and-select switch for an add side of the aggregator, wherein N is a number of the degrees, and L is a number of transponders connected to the aggregator. The multiplexer also includes an optical loopback for external links to the multi-degree reconfigurable optical add/drop multiplexer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to transponder aggregator-based optical loopback in a multi-degree reconfigurable optical add/drop multiplexer (MD-ROADM).

Some exemplary features and benefits of the present principles include, but are not limited to, enabling all types of loopback functions, the capability of control remotely, achieving fast validation on the node and the connections, simple design and implementation, and adding useful capability to the switching node.

Figure 1:
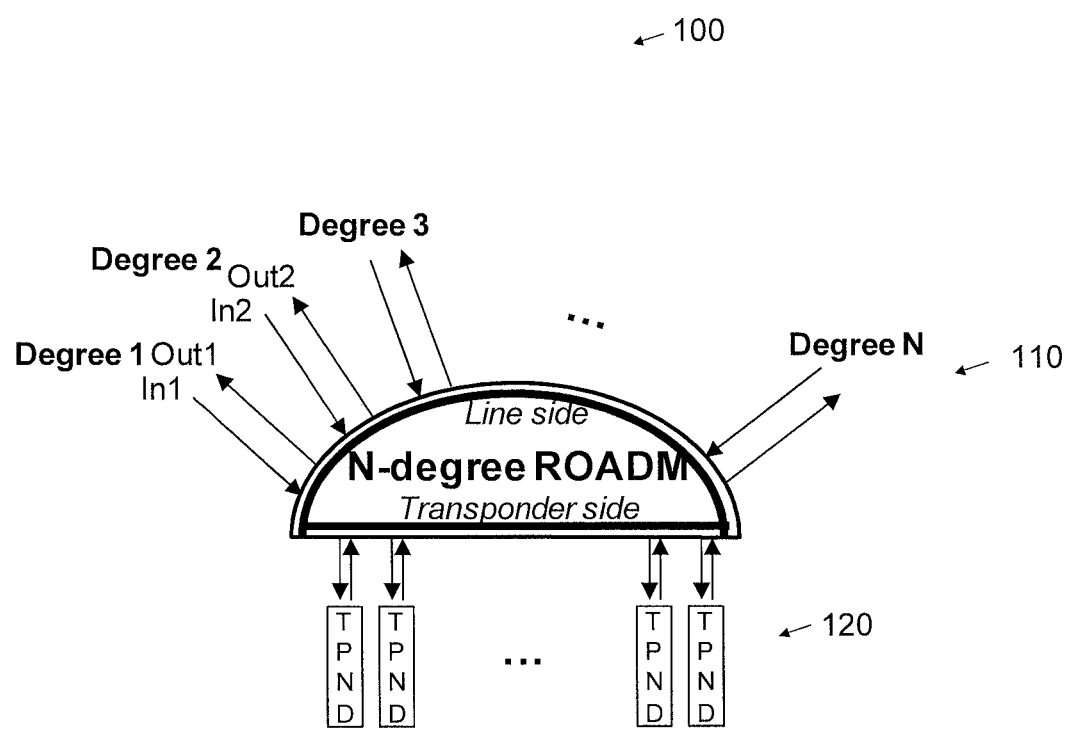
FIG. 1 shows the connection of an N-degree CDC ROADM 100 to which the present principles can be applied, in accordance with an embodiment of the present principles.

FIG. 1 shows the connection of an N-degree CDC ROADM 100 to which the present principles can be applied, in accordance with an embodiment of the present principles. The acronym "CDC" refers to colorless, directionless, and contention-less. The N-degree CDC ROADM 100 has N fiber pairs 110 at the line side, one pair or each degree. These fibers carry WDM signals. There are another K fiber pairs 120 connecting to the K transponders (TPND) at the transponder side.

Figure 2:
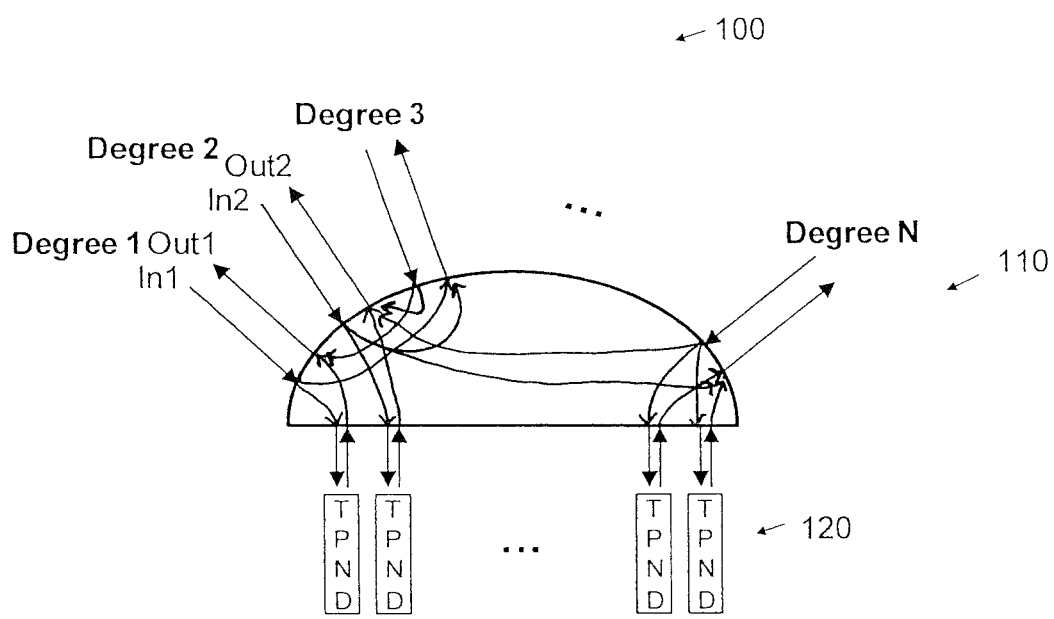
FIG. 2 shows the operation of the N-degree CDC ROADM 100 of FIG. 1 to which the present principles can be applied, in accordance with an embodiment of the present principles.

FIG. 2 shows the operation of the N-degree CDC ROADM 100 of FIG. 1 to which the present principles can be applied, in accordance with an embodiment of the present principles. The ROADM performs cross-connect, add, and drop functions among the input/output fibers and the transponders (TPND).

Since a ROADM node handles large amount of data and has multiple fiber connections, it is important to provide the capability to validate each fiber connection. Optical loopback is a method to perform such validation. By setting up an optical loopback path, transmitting a test signal, and measuring the received signal, the network operator/user can check whether the optical connection is operating properly. Therefore, it is very useful for the ROADM node to offer the capability to set up optical loopback paths during link validation, and to tear down these loopback paths to restore the regular ROADM connection functions after the validation.

There are different types of links in a ROADM node. Therefore, different loopback connections are required.

Figure 3:
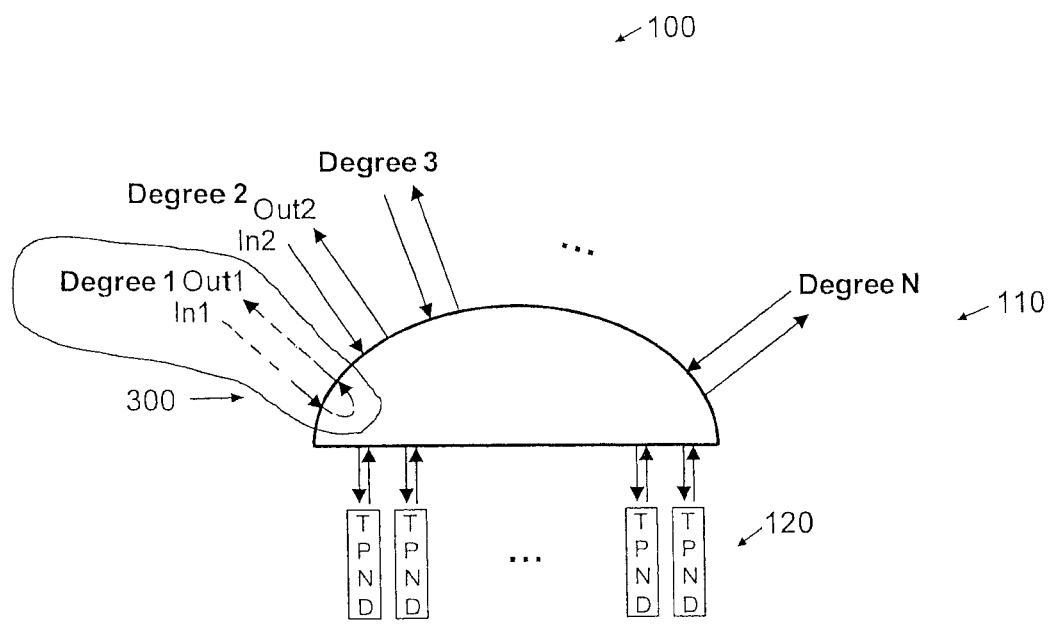
FIG. 3 shows a line loopback 300 in the N-degree CDC ROADM 100 of FIG. 1 to which the present principles can be applied, in accordance with an embodiment of the present principles.

FIG. 3 shows a line loopback 300 in the N-degree CDC ROADM 100 of FIG. 1 to which the present principles can be applied, in accordance with an embodiment of the present principles. The line loopback 300 is a loopback connection between the input fiber and the output fiber from the same degree at the line side, as illustrated by the dashed lines in FIG. 3. In further detail, the line loopback 300 involves the 3 dashed lines on the line side encircled with respect to the reference numeral 300.

Figure 4:
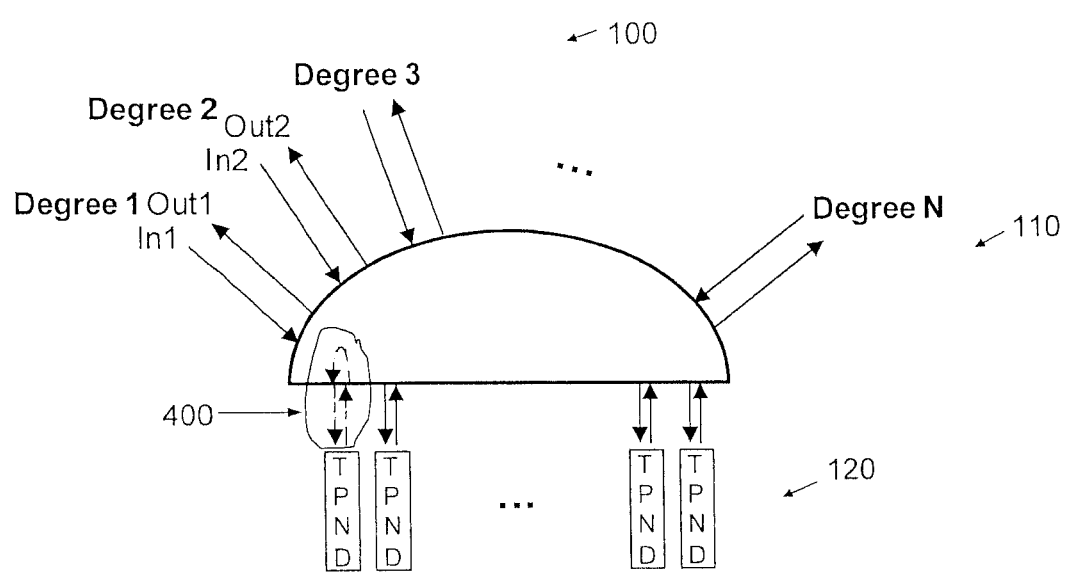
FIG. 4 shows an optical local loopback 400 in the N-degree CDC ROADM 100 of FIG. 1 to which the present principles can be applied, in accordance with an embodiment of the present principles.

FIG. 4 shows an optical local loopback 400 in the N-degree CDC ROADM 100 of FIG. 1 to which the present principles can be applied, in accordance with an embodiment of the present principles. The optical local loopback 400 is a loopback connection that connects the add/drop port pair from/to a transponder, as illustrated by the dashed lines in FIG. 4. In further detail, the optical local loopback 400 involves the 3 dashed lines on the transponder side encircled with respect to the reference numeral 400.

If there is a loss of signal at the output of a node, an optical local loopback can be used to check whether damage occurs at the external fiber link or within the node. An optical local loopback is useful especially if the transponder is physically located away from the ROADM node. Note that an optical local loopback is different from an "electrical local loopback" where an optical signal is received and converted into electrical signal by the transponder, and then retransmitted back by the transponder.

Figure 5:
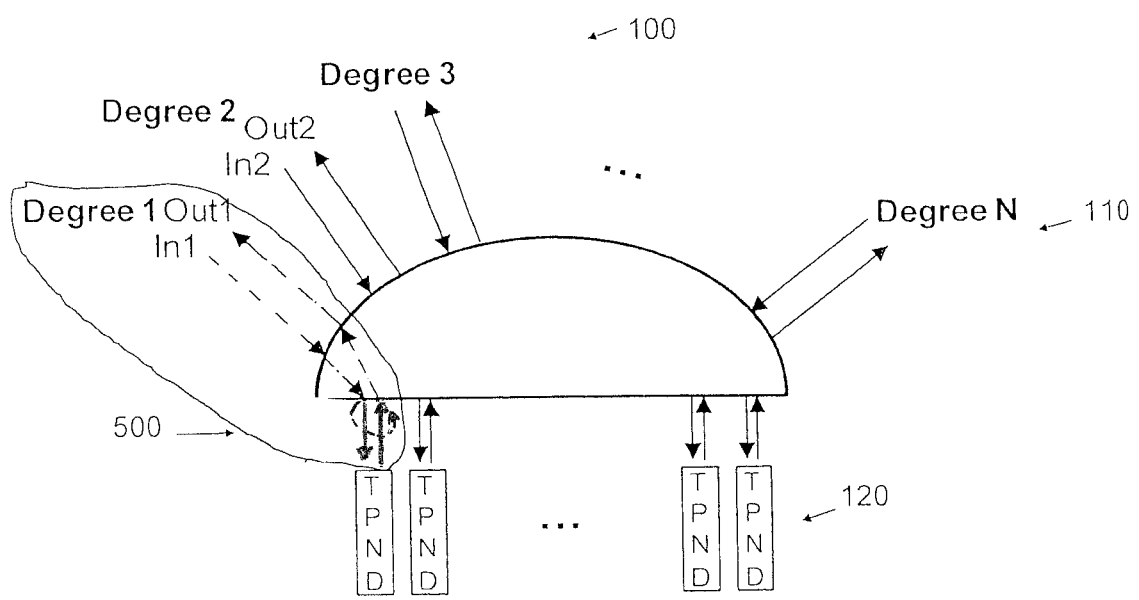
FIG. 5 shows a far end path loopback 500 in the N-degree CDC ROADM 100 of FIG. 1 to which the present principles can be applied, in accordance with an embodiment of the present principles.

FIG. 5 shows a far end path loopback 500 in the N-degree CDC ROADM 100 of FIG. 1 to which the present principles can be applied, in accordance with an embodiment of the present principles. The far end path loopback 500 provides a loopback connection between the input and output from a degree through the ROADM node, as illustrated by the dashed lines in FIG. 5. In further detail, the far end path loopback 400 involves the 5 dashed lines on the transponder side encircled with respect to the reference numeral 600. That is, all the dashed lines that are encircled with respect to the reference numeral 600, and not the solid lines, are part of the far end path loopback. Of course, other implementations of a far end path loopback can also be formed in accordance with the teachings of the present principles, while maintaining the spirit of the present principles.

It is desirable for the loopback-enabled ROADM node to provide all of these loopback connections.

Since a feature of the ROADM is to replace manual operation by software controlled remote reconfiguration, it is desirable that such set up/tear down operation of loopback paths can be controlled by the ROADM controller. This will not only reduce manual operation cost, but also ensure fast and reliable operation.

Therefore, a target of the present principles is to design a solution to allow remotely reconfigurable loopback (all 3 types) in a MD-CDC-ROADM node.

In an embodiment, the present principles modify the transponder aggregator in a MD-CDC-ROADM architecture to enable the line loopback, the optical local loopback, and the far end path loopback. By allocating loopback ports in a split-and-select switch, the loopback functions are achieved. This can be controlled through remote software.

Figure 6:
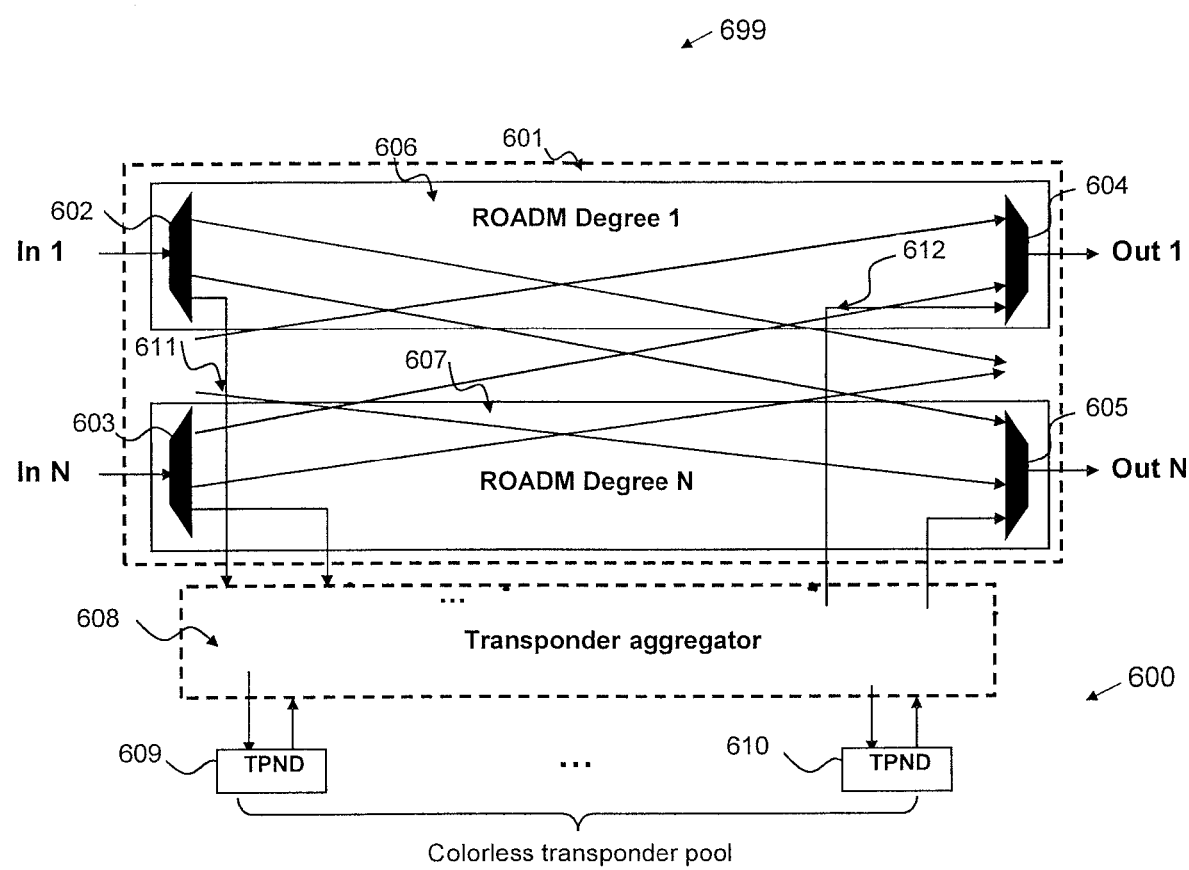
FIG. 6 shows a MD-CDC ROADM 699 with a colorless transponder pool 600, in accordance with an embodiment of the present principles.

FIG. 6 shows a MD-CDC ROADM 699 with a colorless transponder pool 600, in accordance with an embodiment of the present principles. In many MD-CDC-ROADM architectures, a node can be divided into 2 sections, as shown in FIG. 6. The first section is called the ROADM section 601, which performs the cross-connect/through operation for the WDM signals among all degrees. The phrase "connection operations" as used herein is intended to cover cross-connect operations and through-connect operations for the WDM signals. The ROADM section 601 uses a separator (e.g., 602, 603) to separate each WDM signal into individual channels and switches each of them to the respective output ports, as well as to the transponder aggregator section for add/drop (such as path 611). At each output port, a combiner (e.g., 604, 605) is used to combine the WDM signal from different input sources, as well as the added signals from the transponder aggregator section (such as path 612). To reduce the cost, an optical splitter/coupler can be used at either the separator or the combiner. Usually the ROADM section for each degree can be separated (e.g., 606 and 607) to allow modular operation and more flexible node configuration. The second section is called the transponder aggregator section (608), which handles the CDC add/drop operation. In a MD-CDC-ROADM node, the drop signals come from different degrees and might include multiple signals with the same wavelength. Similarly, the add channels are sent to multiple output degrees. The transponder aggregator connects to a pool of transponders (e.g., 609, 610), which are colorless (meaning that the wavelength of each transponder can be tuned dynamically).

There are different designs to construct a transponder aggregator. In an embodiment, we use the split-and-select (S&S) switch architecture.

Figure 7:
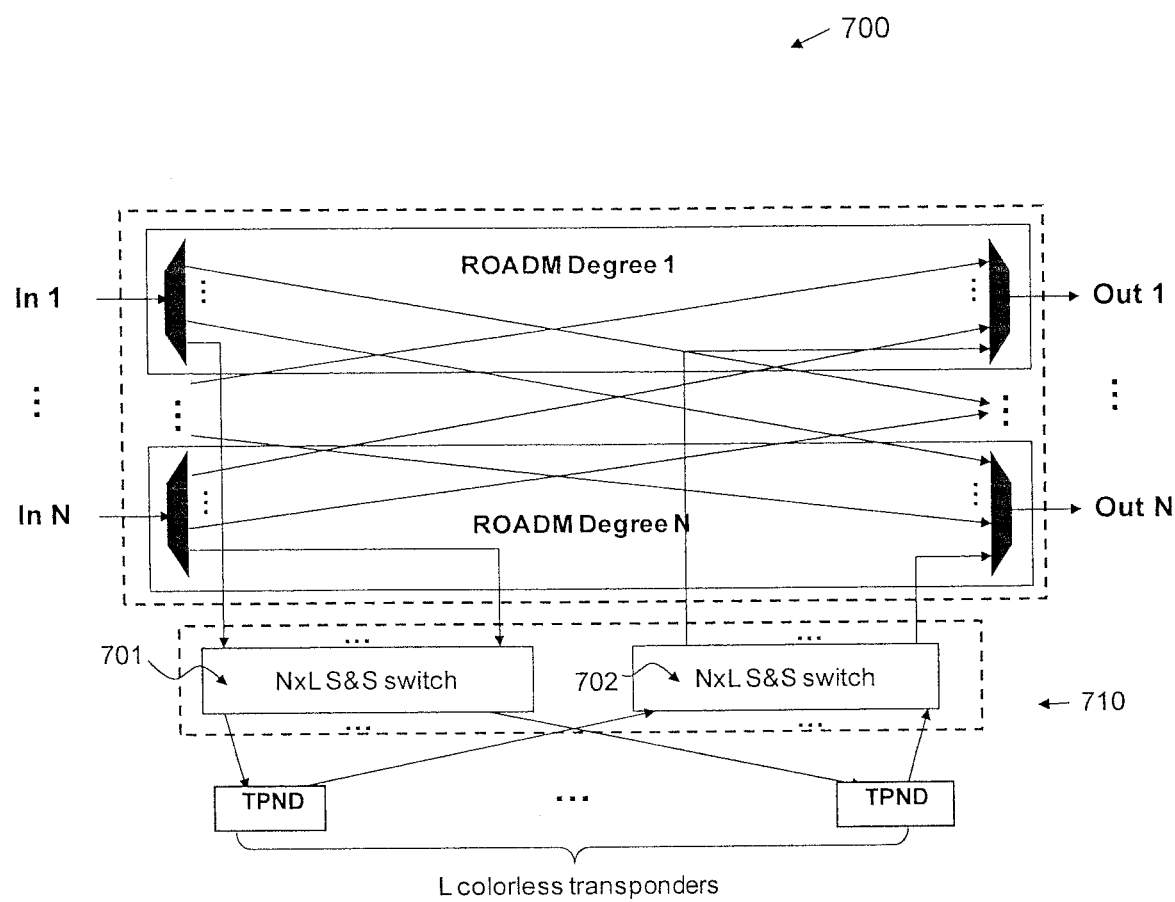
FIG. 7 shows a MD-CDC ROADM architecture 700 with a split-and-select (S&S) switch-based transponder aggregator 710, in accordance with an embodiment of the present principles.

FIG. 7 shows a MD-CDC ROADM architecture 700 with a split-and-select (S&S) switch-based transponder aggregator 710, in accordance with an embodiment of the present principles. The transponder aggregator has a N×L S&S switch for the drop side (701), and another N×L S&S switch for the add side (702). Here, N is the number of degrees, and L is the number of transponders connected to the transponder aggregator.

Figure 8:
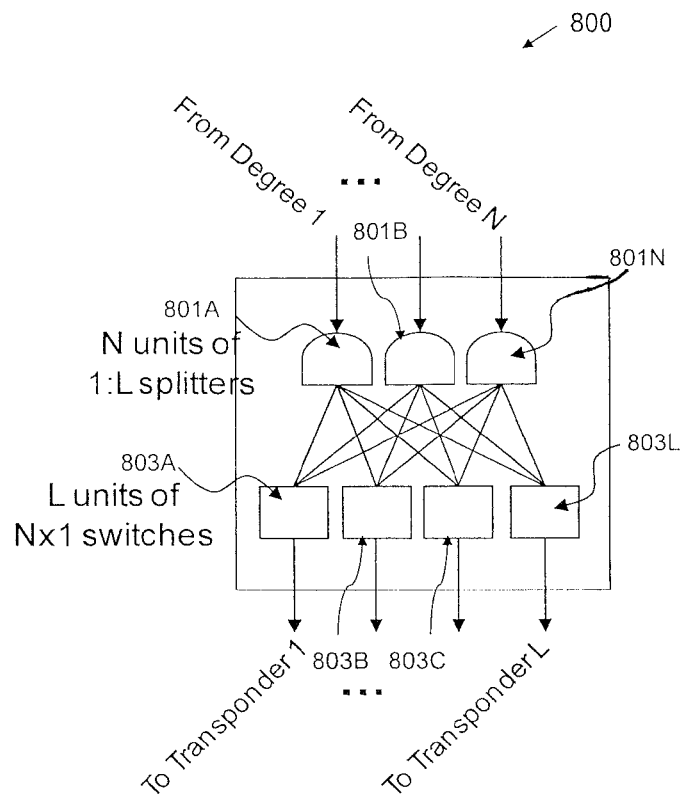
FIG. 8 shows a split-and-select (S&S) switch 800, in accordance with an embodiment of the present principles.

FIG. 8 shows a split-and-select (S&S) switch 800, in accordance with an embodiment of the present principles. Functionally, the split-and-select (S&S) switch 800 includes an array of splitters (801A, 801B, . . . , 801N) and an array of switches (803A, 803B, . . . , 803L), and the interconnection between them. In the N×L S&S switch 800, there are N splitters in the array (one for each degree), and each splitter is a 1:L splitter. Also, there are L switches in the switch array (one for each transponder), and each switch is an N×1 optical switch. Each splitter takes the input WDM signals from the respective degree, and sends the same copy to all L switches. Each switch receives the WDM signals from all degrees, and selects the correct degree that includes the signal to be dropped at the specific transponder.

Note that since the S&S switch 800 does not have wavelength selection function (unlike a WSS), in some transponder aggregator designs, a tunable optical filter is placed at each S&S switch output to select the appropriate WDM channel to be dropped. However if the optical receiver uses coherent technology, or if there is only single channel at the output of the S&S switch, the tunable optical filter can be eliminated.

Figure 9:
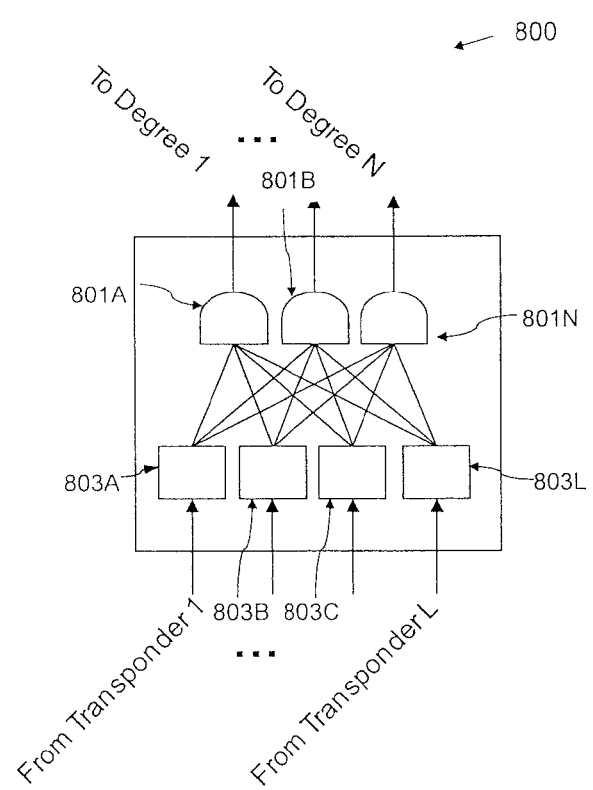
FIG. 9 shows the split-and-select (S&S) switch 800 of FIG. 8 operating in the reverse direction from that shown in FIG. 8, in accordance with an embodiment of the present principles.

FIG. 9 shows the split-and-select (S&S) switch 800 of FIG. 8 operating in the reverse direction from that shown in FIG. 8, in accordance with an embodiment of the present principles. Here the 1:L optical splitters function as L:1 optical couplers (still the same devices) and the N×1 switches function as 1×N switches (also the same devices). For application at the drop side 701 of the transponder aggregator of FIG. 7, the direction shown in FIG. 8 is used. For application at the add side 702 of the transponder aggregator of FIG. 7, the direction shown in FIG. 9 is used.

Figure 10:
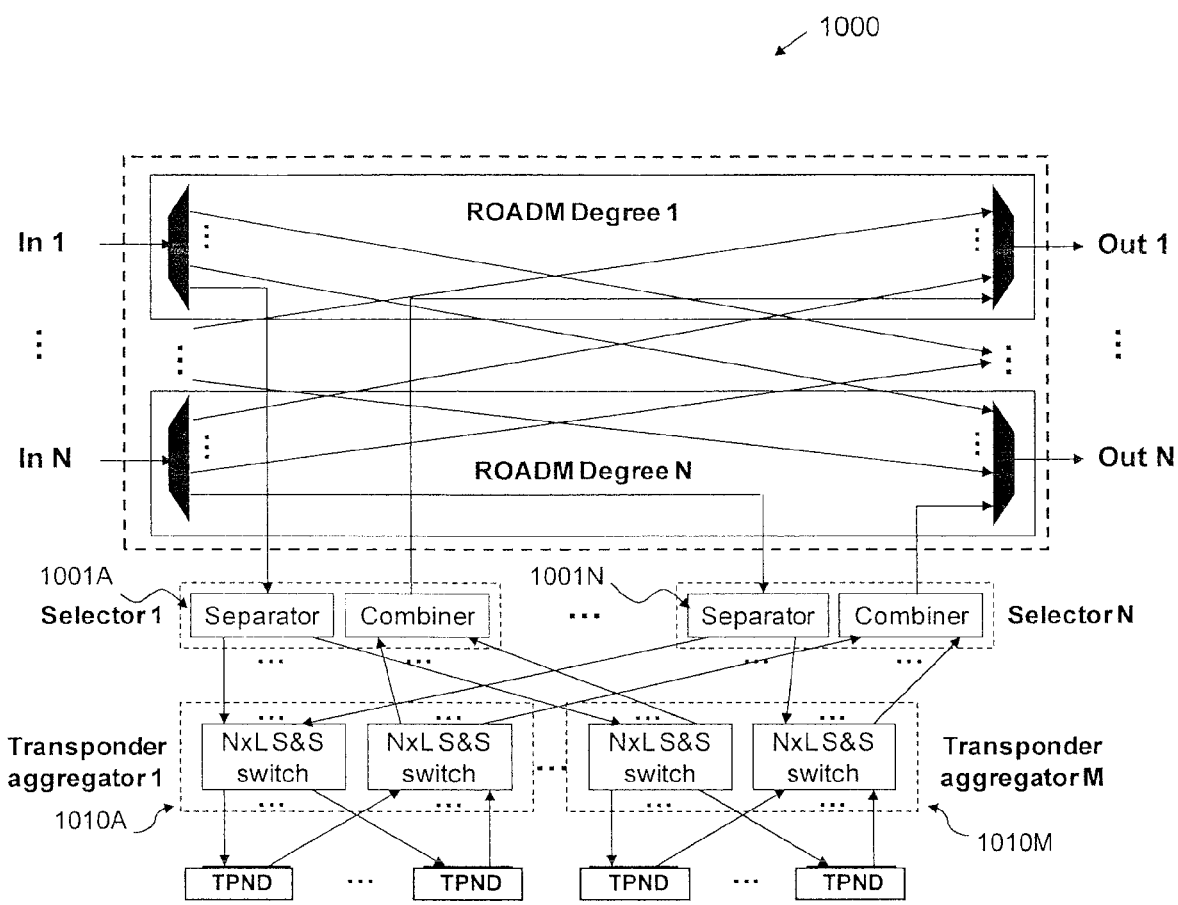
FIG. 10 shows a MD-CDC-ROADM 1000 with multiple transponder aggregators, in accordance with an embodiment of the present principles.

In most cases, only portion of the maximum WDM channel capacity in a node needs to be added/dropped locally. For example, if the node has N degrees and each degree includes up to K WDM channels, there will be up to K WDM channels passing the ROADM node. So the number L in the N×L S&S switches for the transponder aggregator is usually smaller than K. In the case that more add/drop ports are required in a future node upgrade, and in the case that the number of ports in the S&S switch 800 cannot be easily increased, additional transponder aggregator(s) can be added, as shown in FIG. 10. FIG. 10 shows a MD-CDC-ROADM 1000 with multiple transponder aggregators, in accordance with an embodiment of the present principles. There are several methods to add the multiple transponder aggregators 1010A, . . . , 1010M. One method is to place a selector (1001A, . . . , 1001N) between each degree's ROADM module and the transponder aggregator modules. Each of the selectors (1001A, . . . , 1001N) includes a respective separator and a respective combiner. Another method is to add more output ports to the WDM separator (602, 603) as shown in FIG. 6 to send the input signals to additional transponder aggregators.

Figure 11:
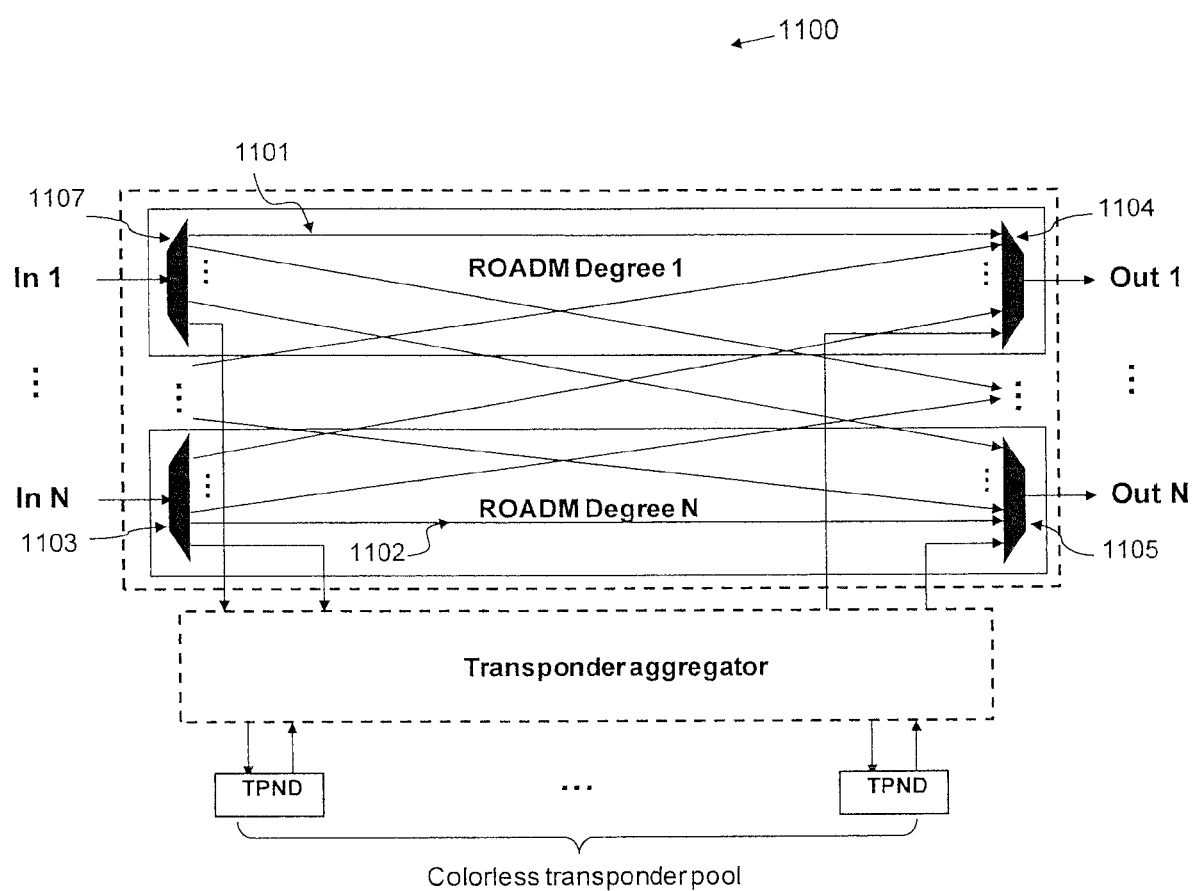
FIG. 11 shows an optical line loopback in a multi-degree reconfigurable optical add/drop multiplexer (MD-ROADM), in accordance with an embodiment of the present principles.

FIG. 11 shows an optical line loopback in a multi-degree reconfigurable optical add/drop multiplexer (MD-ROADM), in accordance with an embodiment of the present principles. Optical line loopback can be easily achieved in the MD-ROADM node by adding a connection path between the input and output of each degree, as shown in 1101 and 1102 in FIG. 11. This requires an additional port at the WDM separator (1102, 1103) and the WDM combiner (1104, 1105).

Figure 12:
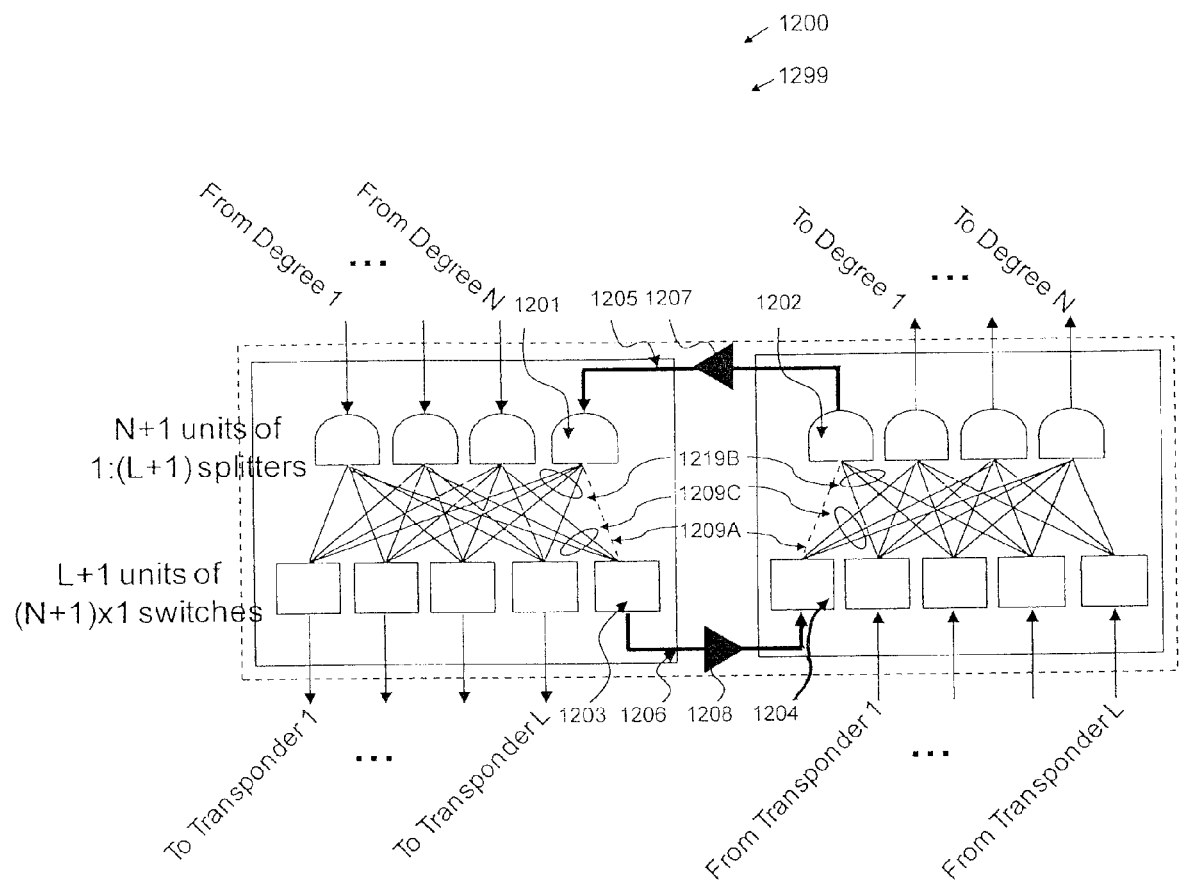
FIG. 12 shows a modification 1200 of a transponder aggregator 1299, in accordance with an embodiment of the present principles.

Optical local loopback and optical far end path loopback are achieved by modifying the S&S switches in the transponder aggregator. FIG. 12 shows a modification 1200 of a transponder aggregator 1299, in accordance with an embodiment of the present principles. Basically, one additional input port and one additional output port are added to the N×L S&S switches. Therefore, they both became (N+1)×(L+1) S&S switches, except that no connection is required between the added splitter 1201 (or coupler 1202 and the added N×1 switch 1203 (or 1×N switch 1204), as shown in the lines 1209A in FIG. 12 which indicate no connection. The L ports of the additional splitter (or coupler) connect to each of the L existing units of N×1 (or 1×N) switches (the lines 1209B). The N ports of the additional switches connect to each of the N existing units of 1:L splitter (or L:1 coupler) (the lines 1209C). The common ends of the added splitter 1201 and the added combiner 1202 are interconnected (the line 1205). The common ends of these two added switches 1203 and 1204 are also interconnected (the line 1206).

Figure 13:
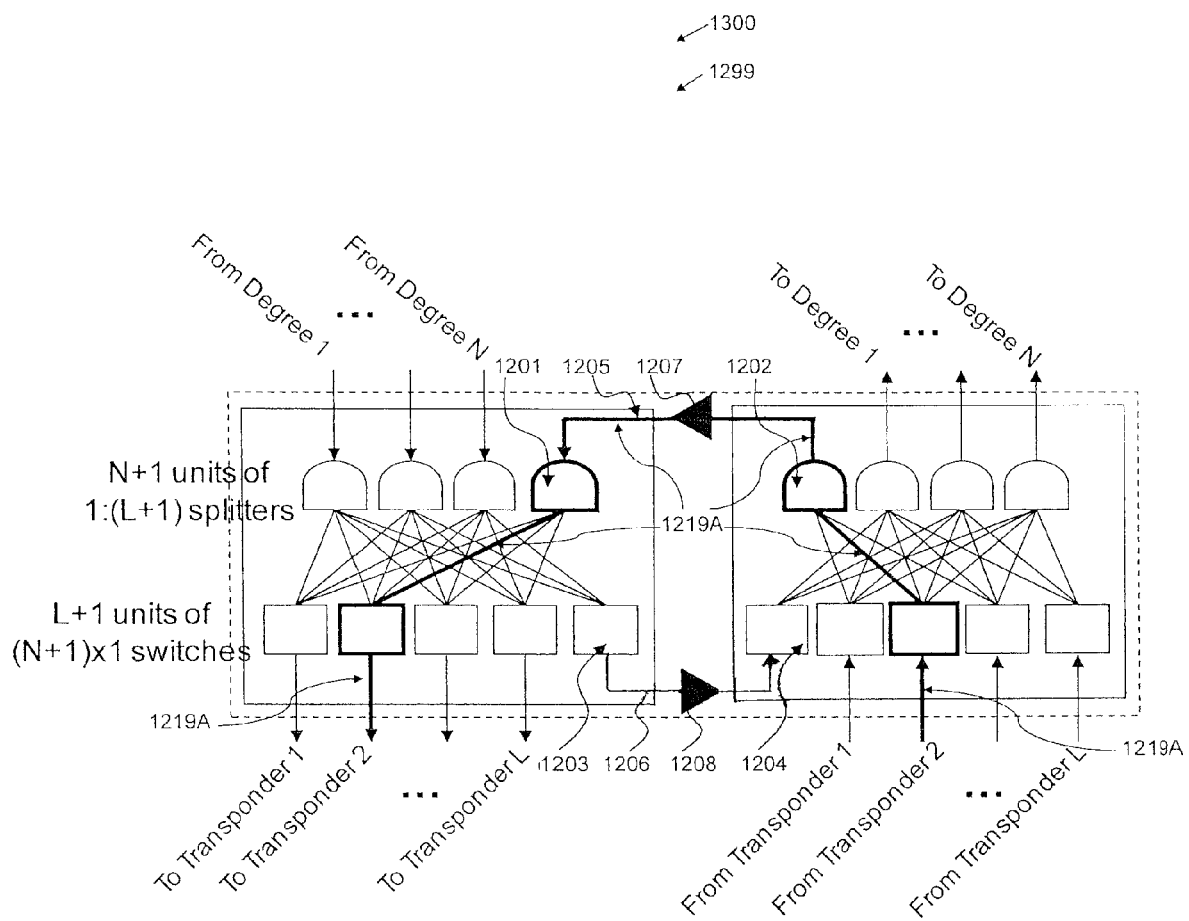
FIG. 13 shows an optical loopback operation 1300 of the transponder aggregator 1299 of FIG. 12, in accordance with an embodiment of the present principles.

FIG. 13 shows an optical loopback operation 1300 of the transponder aggregator 1299 of FIG. 12, in accordance with an embodiment of the present principles. When the optical local loopback is required for a particular transponder (such as Transponder 2 in the example illustrated in FIG. 13), the add side 1×(N+1) optical switch for this transponder is switched to the added coupler 1202, so the signal from the transponder passes through the fiber 1205 between the added splitter 1201 and the added coupler 1202) to reach the drop side, and the corresponding (N+1)×1 optical switch in the drop side is switched to the added splitter 1201 to send the signal back to the corresponding transponder. The optical local loopback is illustrated by the thick lines 1219A in FIG. 13. If the insertion loss of this loopback path is too high and exceeds the acceptable limit, an optical amplifier (such as 1207) can be placed in the link to boost the signal power.

Figure 14:
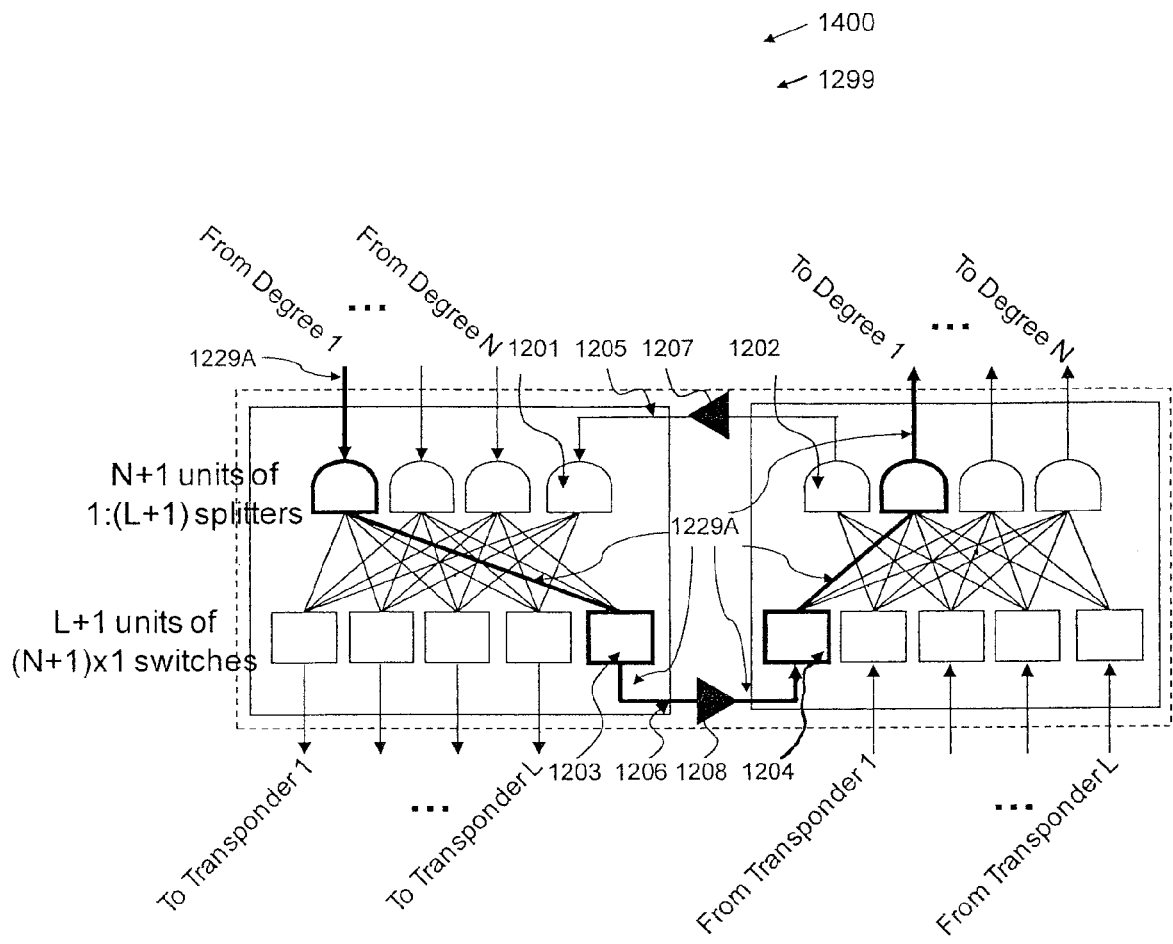
FIG. 14 shows an optical far end path loopback operation 1400 of the transponder aggregator 1299 of FIG. 12, in accordance with an embodiment of the present principles.

FIG. 14 shows an optical far end path loopback operation 1400 of the transponder aggregator 1299 of FIG. 12, in accordance with an embodiment of the present principles. For the optical far end path loopback, the input signal from the specific degree is sent to the transponder aggregator through path such as 611 in FIG. 6. The added (N+1)×1 switch 1203 at the drop side of the transponder aggregator is switched to the corresponding splitter (such as the one from Degree 1 in the example illustrated in FIG. 14), which selects this signal and sends it to the added 1×(N+1) switch 1204 at the add side through the fiber link 1206. This add side switch 1204 then switches the signal to the corresponding coupler (such as the one to Degree 1 in the example illustrated in FIG. 14), which in turn sends the signal to the output of the node through link such as 612 in FIG. 6. This operation is illustrated by the thick lines 1229A in FIG. 14. If the insertion loss of this loopback path is too high and exceeds the acceptable limit, an optical amplifier (such as 1208) can be placed in the link to boost the signal power.

These operations are performed by changing the switch status of the optical switches (such as the WSS, the 1×(N+1) switch, and the (N+1)×1 switch) in the ROADM node, which can be controlled remotely through management software. Thus, the present principles allow automatic remote validation of all links.

Figure 15:
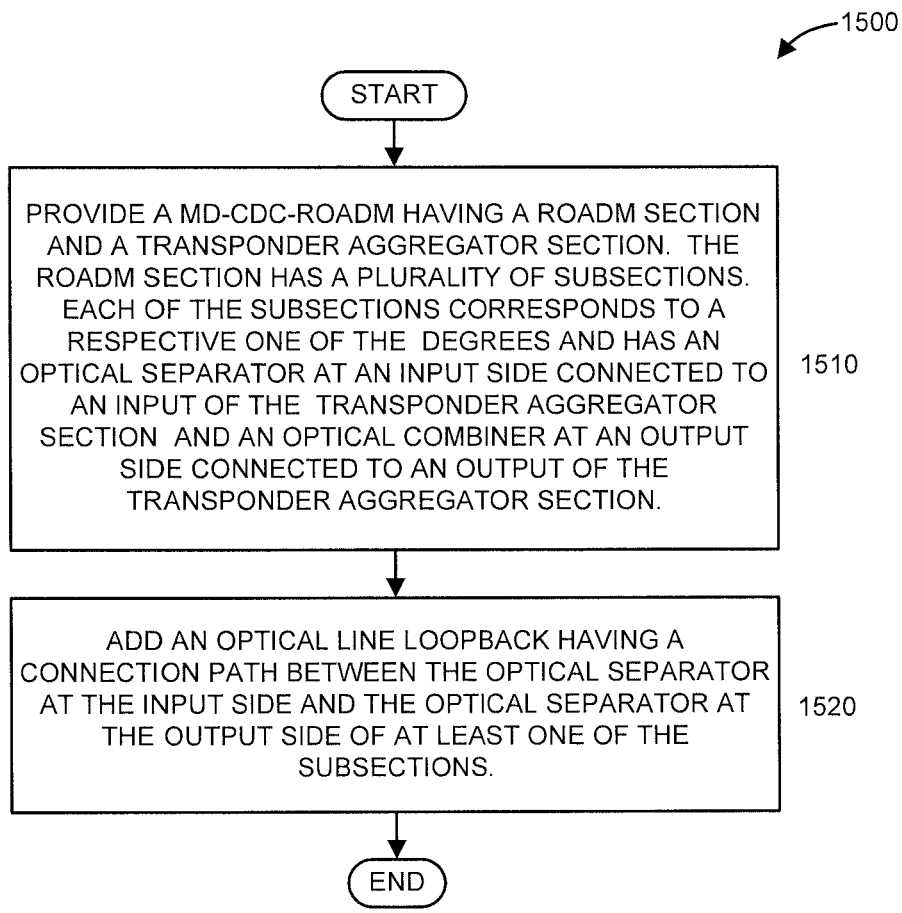
FIG. 15 shows a method 1500 for providing an optical line loopback in a multi-degree colorless, directionless, contention-less, reconfigurable optical add/drop multiplexer (MD-CDC-ROADM), in accordance with an embodiment of the present principles.

FIG. 15 shows a method 1500 for providing an optical line loopback in a multi-degree colorless, directionless, contention-less, reconfigurable optical add/drop multiplexer (MD-CDC-ROADM), in accordance with an embodiment of the present principles.

At step 1510, provide a MD-CDC-ROADM having a reconfigurable optical add/drop multiplexer section and a transponder aggregator section. The multiplexer section has a plurality of subsections. Each of the subsections corresponds to a respective one of the degrees and has an optical separator (e.g., 1107, 1103) at an input side connected to an input of the transponder aggregator section and an optical combiner (e.g., 1104, 1105) at an output side connected to an output of the transponder aggregator section.

At step 1520, add an optical line loopback (e.g., 1101, 1102) having a connection path between the optical separator at the input side and the optical combiner at the output side of at least one of the subsections.

Figure 16:
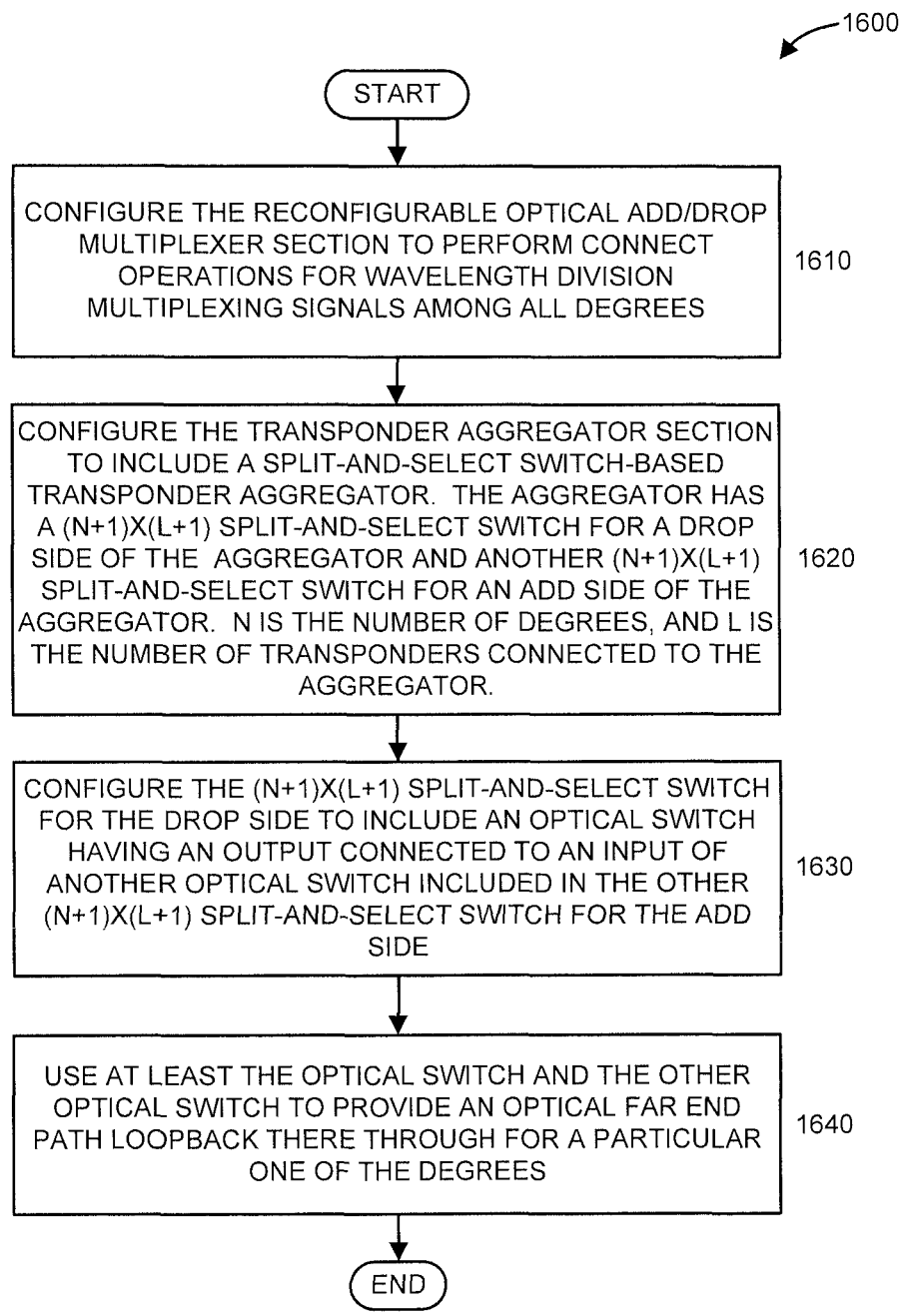
FIG. 16 shows a method 1600 for providing an optical local loopback in a multi-degree colorless, directionless, contention-less, reconfigurable optical add/drop multiplexer (MD-CDC-ROADM), in accordance with an embodiment of the present principles.

FIG. 16 shows a method 1600 for providing an optical local loopback in a multi-degree colorless, directionless, contention-less, reconfigurable optical add/drop multiplexer (MD-CDC-ROADM) having a reconfigurable optical add/drop multiplexer section and a transponder aggregator section, in accordance with an embodiment of the present principles.

At step 1610, configure the reconfigurable optical add/drop multiplexer section to perform connect operations for wavelength division multiplexing signals among all degrees.

At step 1620, configure the transponder aggregator section to include a split-and-select switch-based transponder aggregator. The aggregator has a (N+1)×(L+1) split-and-select switch for a drop side of the aggregator and another (N+1)×(L+1) split-and-select switch for an add side of the aggregator, wherein N is a number of the degrees, and L is a number of transponders connected to the aggregator.

At step 1630, configure the (N+1)×(L+1) split-and-select switch for the drop side to include an optical switch 1203 having an output connected to an input of another optical switch 1204 included in the other (N+1)×(L+1) split-and-select switch for the add side.

At step 1640, use at least the optical switch 1203 and the other optical switch 1204 to provide an optical far end path loopback there through for a particular one of the degrees.

Figure 17:
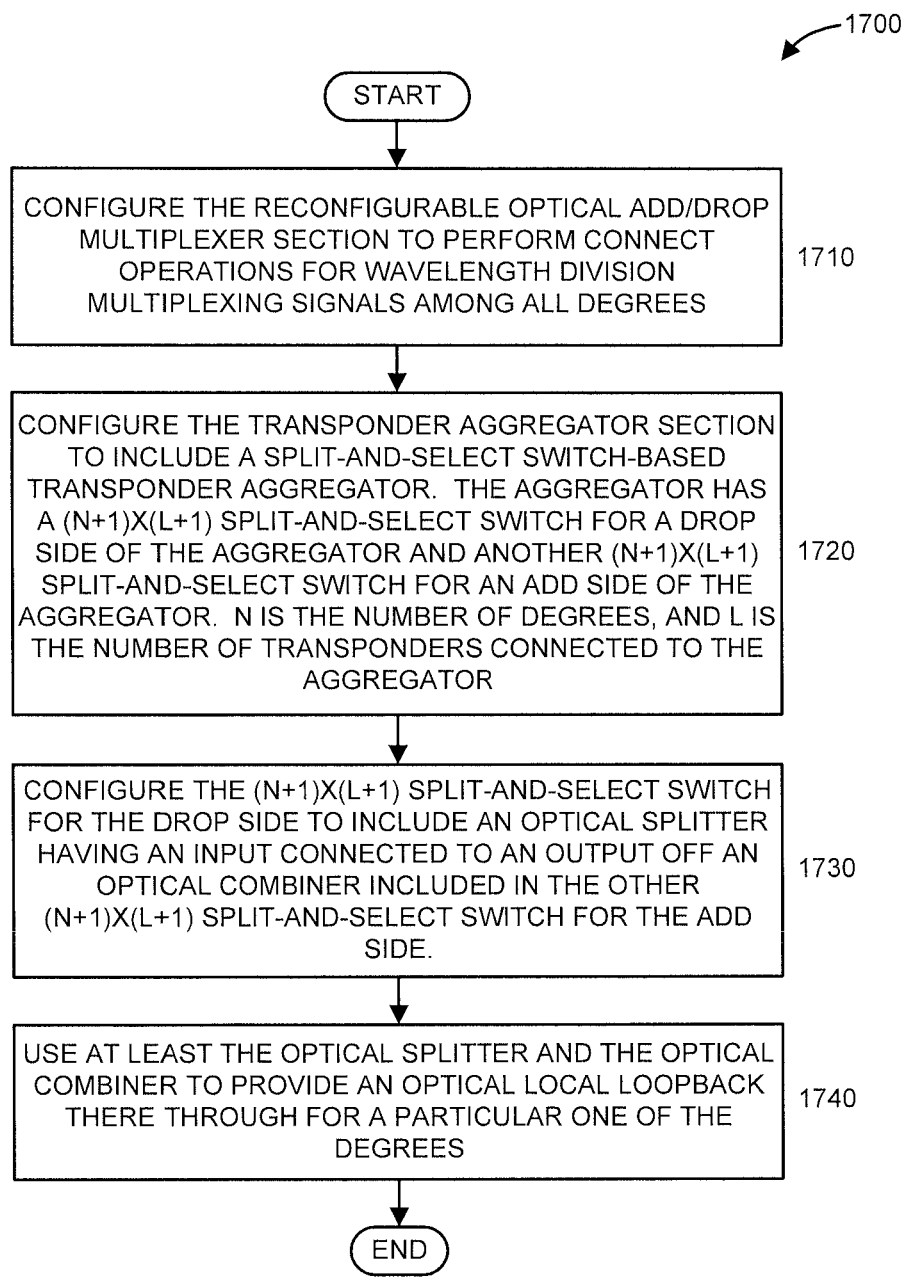
FIG. 17 shows a method 1700 for providing an optical far end path loopback in a multi-degree colorless, directionless, contention-less, reconfigurable optical add/drop multiplexer (MD-CDC-ROADM), in accordance with an embodiment of the present principles.

FIG. 17 shows a method 1700 for providing an optical far end path loopback in a multi-degree colorless, directionless, contention-less, reconfigurable optical add/drop multiplexer (MD-CDC-ROADM), in accordance with an embodiment of the present principles.

At step 1710, configure the reconfigurable optical add/drop multiplexer section to perform connect operations for wavelength division multiplexing signals among all degrees.

At step 1720, configure the transponder aggregator section to include a split-and-select switch-based transponder aggregator. The aggregator has a (N+1)×(L+1) split-and-select switch for a drop side of the aggregator and another (N+1)×(L+1) split-and-select switch for an add side of the aggregator, wherein N is a number of the degrees, and L is a number of transponders connected to the aggregator.

At step 1730, configure the (N+1)×(L+1) split-and-select switch for the drop side to include an optical splitter 121 having an input connected to an output of an optical combiner 1202 included in the other (N+1)×(L+1) split-and-select switch for the add side.

At step 1740, use at least the optical splitter 1201 and the optical combiner 1202 to provide an optical local loopback there through for a particular one of the degrees.

A description will now be given of some key differentiators of the present principles with respect to the prior art. One differentiator is modifying the S&S switches in the transponder aggregator to allow optical local loopback on any transponder port. Another differentiator is modifying the S&S switches in the transponder aggregator to allow optical far end path loopback on any degree. Yet another differentiator is allowing optical line loopback by providing loopback path in the ROADM. Still another differentiator is an optical amplifier to maintain the power level. A further differentiator is maintaining the CDC switching function in the multi-degree ROADM node.

A description will now be given of some features of the present principles that are different from the prior art: the addition of additional ports, splitter/coupler and switches in the transponder aggregator; the addition of an internal fiber link between the added splitter and coupler; the addition of an internal fiber link between the added switches; and the addition of an optional optical amplifier to control power level; the allowing of optical local loopback on any transponder port; and the allowing of optical far end path loopback on any degree.

A description will now be given of some features of the present principles that enable benefits/advantages over the prior art: the addition of additional ports, splitter/coupler and switches in the transponder aggregator; the addition of an internal fiber link between the added splitter and coupler; the addition of an internal fiber link between the added switches; and the addition of an optional optical amplifier to control power level.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A multi-degree colorless, directionless, contention-less, reconfigurable optical add/drop multiplexer, comprising:
    a reconfigurable optical add/drop multiplexer section for performing connect operations for wavelength division multiplexing signals among all degrees;
    a transponder aggregator section having a split-and-select switch-based transponder aggregator, the aggregator having a (N+1)×(L+1) split-and-select switch for a drop side of the aggregator and another (N+1)×(L+1) split-and-select switch for an add side of the aggregator, wherein N is a number of the degrees, and L is a number of transponders connected to the aggregator; and
    an optical loopback for external links to the multi-degree reconfigurable optical add/drop multiplexer,
    wherein the (N+1)×(L+1) split-and-select switch for the drop side comprises an optical switch having an output connected to an input of another optical switch comprised in the other (N+1)×(L+1) split-and-select switch for the add side, and wherein at least the optical switch and the other optical switch are used to provide an optical far end path loopback there through for a particular one of the degrees.

2. The multiplexer of claim 1, wherein the (N+1)×(L+1) split-and-select switch for the drop side and the other (N+1)×(L+1) split-and-select switch for the add side each comprise a respective array of optical switches, wherein each of the switches, except the optical switch and the other optical switch used to provide the optical far end path loopback, are connected to a respective one of the transponders.

3. A multi-degree colorless, directionless, contention-less, reconfigurable optical add/drop multiplexer, comprising:
    a reconfigurable optical add/drop multiplexer section for performing connect operations for wavelength division multiplexing signals among all degrees;
    a transponder aggregator section having a split-and-select switch-based transponder aggregator, the aggregator having a (N+1)×(L+1) split-and-select switch for a drop side of the aggregator and another (N+1)×(L+1) split-and-select switch for an add side of the aggregator,
    wherein N is a number of the degrees, and L is a number of transponders connected to the aggregator; and
    an optical loopback for external links to the multi-degree reconfigurable optical add/drop multiplexer,
    wherein the (N+1)×(L+1) split-and-select switch for the drop side comprises an optical splitter having an input connected to an output of an optical combiner comprised in the other (N+1)×(L+1) split-and-select switch for the add side, and wherein at least the optical splitter and the optical combiner are used to provide an optical local loopback there through for a particular one of the degrees.

4. The multiplexer of claim 3, wherein the (N+1)×(L+1) split-and-select switch for the drop side comprises an array of optical splitters and the other (N+1)×(L+1) split-and-select switch for the add side comprises an array of optical combiners, wherein each of the optical splitters, except the optical splitter used to provide the optical local loopback, is connected to the multiplexer section to input there from a signal corresponding to a respective one of the degrees, and wherein each of the optical combiners, except the optical combiner used to provide the optical local loopback, is connected to the multiplexer section to output there to the signal corresponding to the respective one of the degrees.

5. A multi-degree colorless, directionless, contention-less, reconfigurable optical add/drop multiplexer, comprising:
    a reconfigurable optical add/drop multiplexer section for performing connect operations for wavelength division multiplexing signals among all degrees;
    a transponder aggregator section having a split-and-select switch-based transponder aggregator, the aggregator having a (N+1)×(L+1) split-and-select switch for a drop side of the aggregator and another (N+1)×(L+1) split-and-select switch for an add side of the aggregator,
    wherein N is a number of the degrees, and L is a number of transponders connected to the aggregator; and
    an optical loopback for external links to the multi-degree reconfigurable optical add/drop multiplexer,
    wherein the N×L split-and-select switch for the drop side and the add side comprise a respective array of (L+1) optical switches, each of the (L+1) optical switches, except a given one on the drop side and given one on the add side, connected to a respective one of the transponders,
    wherein the N×L split-and-select switch for the drop side comprises an array of (N+1) optical splitters, each of the (N+1) optical splitters, except a particular one, connected to a respective one of the degrees,
    wherein the N×L split-and-select switch for the add side comprises an array of (N+1) optical combiners, each of the (N+1) optical combiners, except a specific one, corresponding to a respective one of the degrees, and
    wherein an input of the particular one of the (N+1) optical splitters on the drop side is connected to an output of the specific one of the (N+1) optical combiners on the add side.

6. The multiplexer of claim 5, wherein each of the (L+1) optical switches for the drop side, except the given one, has an input connected to all of the (N+1) optical splitters except the particular one and an output connected to a respective one of the transponders.

7. The multiplexer of claim 5, wherein each of the (N+1) optical splitters, except the particular one, has an input corresponding to a respective one of the degrees and an output connected to all of the (L+1) optical switches on the drop side except the given one.

8. The multiplexer of claim 5, wherein each of the (N+1) optical splitters has an output connected to all of the (L+1) optical switches on the drop side except the given one.

9. The multiplexer of claim 5, further comprising an optical local loopback having a connection path from a particular one of the transponders on the add side through a corresponding one of the (L+1) optical switches on the add side, the specific one of the (N+1) optical combiners on the add side, the particular one of the (N+1) optical splitters on the drop side, a corresponding one of the (L+1) optical switches on the drop side, back to the particular one of the transponders.

10. A multi-degree colorless, directionless, contentionless, reconfigurable optical add/drop multiplexer, comprising:
   a reconfigurable optical add/drop multiplexer section for performing connect operations for wavelength division multiplexing signals among all degrees;
   a transponder aggregator section having a split-and-select switch-based transponder aggregator, the aggregator having a (N+1)×(L+1) split-and-select switch for a drop side of the aggregator and another (N+1)×(L+1) split-and-select switch for an add side of the aggregator, wherein N is a number of the degrees, and L is a number of transponders connected to the aggregator; and
   an optical loopback for external links to the multi-degree reconfigurable optical add/drop multiplexer,
   wherein the N×L split-and-select switch for the drop side and the add side comprise a respective array of (L+1) optical switches, each of the (L+1) optical switches, except a given one on the drop side and given one on the add side, connected to a respective one of the transponders,
   wherein the N×L split-and-select switch for the drop side comprises an array of (N+1) optical splitters, each of the (N+1) optical splitters, except a particular one, connected to a respective one of the degrees,
   wherein the N×L split-and-select switch for the add side comprises an array of (N+1) optical combiners, each of the (N+1) optical combiners, except a specific one, corresponding to a respective one of the degrees, and
   wherein an output of the given one of (L+1) optical switches on the drop side is connected to an input of the given one of (L+1) optical switches on the add side.

11. The multiplexer of claim 10, further comprising an optical far end path loopback having a connection path from a particular one of the degrees provided from the reconfigurable optical add/drop multiplexer section through a corresponding one of the (N+1) optical splitters, the given one of the (L+1) optical switches on the drop side, the given one of the (L+1) optical switches on the add side, a corresponding one of the (N+1) optical combiners, back to the particular one of the degrees.

* * * * *